(No Model.)
H. F. D. SCHWAHN.
METHOD OF ROASTING ORES AND RECOVERING VAPORS THEREFROM.
No. 537,941. Patented Apr. 23, 1895.
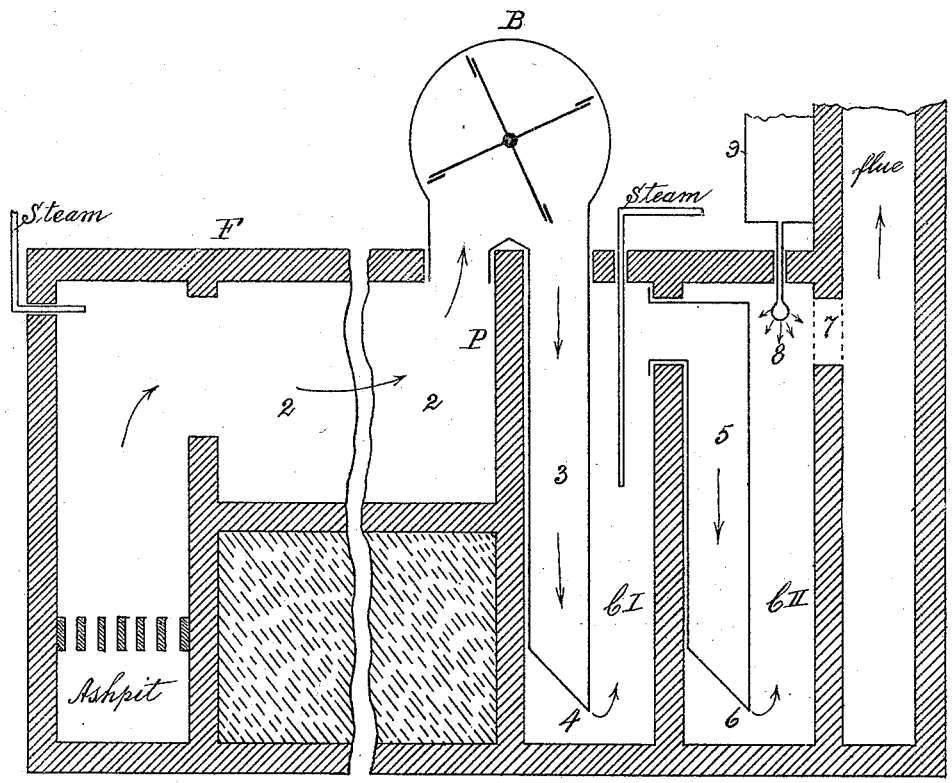
WITNESSES:
G. Schwahn
Henry Stubenrauch
INVENTOR
H. F. D. Schwahn

UNITED STATES PATENT OFFICE.

HEINRICH F. D. SCHWAHN, OF KANSAS CITY, MISSOURI.

METHOD OF ROASTING ORES AND RECOVERING VAPORS THEREFROM.

SPECIFICATION forming part of Letters Patent No. 537,941, dated April 23, 1895.

Application filed October 22, 1894. Serial No. 526,631. (No specimens.)

*To all whom it may concern:*

Be it known that I, HEINRICH F. D. SCHWAHN, a citizen of the United States, and a resident of Kansas City, in the county of Jackson and State of Missouri, have invented a certain new and useful Improvement in Methods of Roasting Ores and Subliming Minerals and the Recovery of the Evolved Vapors, of which the following is a full, clear, and exact description.

The invention consists in an improved method of roasting ores and subliming minerals and the recovery of the evolved vapors including certain features of novelty hereinafter described and pointed out in the claims, by which the eliminated metallic vapors, within the said roasting and subliming, some of them, or all, are carried into chlorides or carbonates and separated in accordance with their nature, to be recovered and used in the art for smelting, as pigments or for other industrial purposes, and my invention is also profitably applied in smelting for the recovery of the evolved metallic fumes within the same.

The theory of the process is based upon the liberation of the metals in sulfuret ores from the accompanying sulfur by roasting the same, and the reaction created by the produced sulfuric acid with a mixture of nitric acid, hydro-chloric acid and a salt of an alkali metal into which the metallic vapors or fumes evolved within the said roasting, subliming and smelting are led. By the eliminated nascent chlorine of the said reaction, vapors of gold and silver, and such other metals having more affinity for chlorine are carried off as their corresponding chlorides, and other metallic fumes having more affinity for carbon such as lead are carried off by the carbonic acid gas resultant from the combustion for the said roasting, subliming and smelting carbonates.

Merely for convenience and not to confuse the specification I only describe the recovery of the vapors evolved from the roasting and subliming, as the same is identical with the recovery of the vapors evolved from the smelting.

In general terms, my invention comprises an improved process for roasting and subliming and the recovery of the resultant vapors which consists, in mixing ores and minerals to be roasted and sublimed, with a small quantity of nitrate of sodium or potassium and in injecting into the roasting or subliming chamber some aqueous vapors (steam), both for the more readily producing of hydro-sulfuric acid. The evolved metal vapors within the said roasting and subliming are led with the said sulfuric acid, and the resultant carbonic acid gas from the combustion for the said roasting and subliming, into a solution made of nitric acid, hydro-chloric acid, a salt of an alkali metal, preferably in form of chloride of sodium, and water, as a vehicle, to convert by the reaction to follow the bases of the said vapors in accordance to their affinity for chlorine or carbonic acid into chlorides and carbonates, and which are separated then as such and further treated as seems advisable or profitable and known to those skilled in the art. The remainder of the ores and minerals from the roasting and subliming, now nearly free of sulfur, can be further treated, with more advantage, by any known process to recover metallic bases, known to those skilled in the art, as amalgamation, chlorination, cyanogen process or smelting as seems advisable or profitable; but also the ordinary chlorination of the precious minerals can be carried out within the said roasting by introducing chloride of sodium (common salt) into the said roasting chamber, as usually is done for this purpose, and known as roasting and chlorinating to those skilled in the art.

For convenience I describe my invention with special reference to the roasting of sulfuret ores or minerals bearing gold, silver and lead, it being understood, however, that my invention is also applicable to other compounds of sulfur natural or artificial and such ores known as pyrites, low grade ores, refractory ores, &c., or to a mixture of pyrites, &c., and other ores free of sulfur.

In the accompanying drawing, which is hereby made a part of this specification, is shown in section one form of apparatus suitable for the practice of my invention. I do not, however, limit myself to the apparatus shown, since any other suitable apparatus would answer equally as well for the practice of my invention.

Similar letters and figures refer to similar parts throughout the drawing.

F, represents a sectional view of a usual roasting furnace having a fire-box 1, and an opening in the roasting chamber 2, in the top and the end of the furnace near the flue, into which is set a suitable blast-apparatus B, the same being supported by the side of the opening, forming a partition P. The construction of the furnace and the arrangement for the recovery of the vapors are hereinafter fully described.

$C^I$, is a closed chamber made of suitable material, preferably such as brickwork set in hydraulic cement, in connection with the blast apparatus by pipe 3, and which pipe 3 ends into a number of jets 4, which, if in the active state are covered with the chemicals, preferably in form of a solution as above described, into or through which the said vapors or fumes are forced by said blast apparatus, after being exhausted from the roasting chamber by the same.

$C^{II}$, is a second closed chamber like chamber $C^I$, and in connection with the same by means of a pipe 5, which also ends in a number of jets 6, discharging into the lower part of the chamber $C^{II}$, so that the remaining free vapors which accidentally did not combine in the first chamber with chlorine or carbonic acid may here unite with the same by passing through a second solution of the same qualities.

7, is an opening from the chamber $C^{II}$, or the last of any number of chambers if more than two are employed, into a flue to carry off the waste gases.

In the practice of my invention I preferably use the nitric acid, hydro-chloric acid and a salt of an alkali metal in their nascent condition and therefore I produce the same, preferably by the said resultant sulfuric acid from the said roasting and subliming, &c., from their crude material, namely, chloride of sodium and nitrate of sodium or potassium placed within said chambers $C^I$, and $C^{II}$, preferably in form of a solution, with water as a vehicle, the sulfuric acid thereby serving repeatedly first in the form in which the same is introduced and then in combination with the sodium or potassium from the employed chloride of sodium or nitrate of sodium or potassium as sulfates as decomposer and to produce sulfates.

The certain *modus operandi* as preferably accepted as the most convenient is as follows: I mix about one-tenth per cent. of nitrate of sodium or potassium with the previously ground ores or minerals and roast and sublime the same by passing a current of hot gases resultant from the burning combustibles, within the fire box 1, and with the said hot and burning gases I preferably combine a small quantity of aqueous vapors by injecting some steam into the roasting or subliming chamber. Then I set the blast apparatus in motion whereby the gases resultant from the said treatment are exhausted from the said roasting chamber and forced through the chambers $C^I$ and $C^{II}$ and their contents, and from there into the flue. The draft or the admission of the necessary atmospheric air to the fire in the fire box 1, and indirectly into the roasting chamber is thereby perfectly controlled, and this can be assisted best by the doors of the ash pit, if all parts of the roasting chamber are closed and the speed of the blast apparatus is regulated accordingly. Then from time to time I replace the exhausted or charged solutions and preferably in such a way that the solution in the last chamber may take the place of the solution in the first chamber, and I preferably have the new solutions of such a strength that the same may register about 10° Baumé. An excess of one or the other salt produces no injurious effect, but I prefer to have the nitrate always in the minority. The chloride of sodium as well as the nitrate of sodium or potassium are gradually utilized in the operation of the process until all are converted in sulfates which are separated with the baser metals. It is evident that with the passage of the hot gases from the roasting chamber the solution in chamber $C^I$, is set in boiling condition with the generation of acid vapors which readily combine with the said remaining metal vapors having accidentally passed through the boiling solution, the same effect could be accomplished by passing the said vapors resultant from the said treatment through a spray of said solution entering through pipe 8, which is provided with a number of perforations, and the same is in connection with reservoir 9, containing the said solution instead of applying the same in a body, and in this way it being possible to form a number of different arrangements for the baths to any of which my invention would be applicable, I do not limit my invention to the use of any particular arrangement or bath which has been described herein.

Having described my invention, what I claim, and desire to secure by Letters Patent, is—

1. The improvement in the art of roasting ores and subliming minerals, and the recovery of the evolved vapors, which consists, in grinding the ores and minerals, and in mixing the same with nitrate of sodium or potassium; and in roasting and subliming the resultant mixture in a suitable furnace, and in injecting aqueous vapors into the same; and in bringing the vapors resultant from the said treatment, consisting chiefly, of sulfuric acid vapors, carbonic acid gas and metallic vapors, in contact with a combination of chemicals, produced in the manner and for the purpose as specified, and consisting of chloride of sodium, nitrate of sodium or potassium and the resultant nitric acid, hydro-chloric acid and of sulfates of the said alkalies, causing reaction, heating and evaporating the resultant combination thereby and forming vapors, consisting chiefly, of nitric, hydro-chloric, sulfuric and carbonic acids, substantially as and for the purpose set forth.

2. The improvement in the art of roasting ores and subliming minerals, and the recovery of the evolved vapors, which consists, in grinding the ores and minerals, and in mixing the same with nitrate of sodium or potassium; and in roasting and subliming the resultant mixture in a suitable furnace, and in injecting aqueous vapors into the same; and in bringing the vapors resultant from the said treatment, consisting chiefly, of sulfuric acid vapors, carbonic acid gas and metallic vapors, in contact with a combination of nitrate of sodium or potassium and chloride of sodium, for the purpose as specified, causing reactions with the production of chlorides and carbonates of the said metallic vapors and an auxiliary reaction with the production of sulfates of the said alkalies, and heating and evaporating the resultant combination, thereby forming vapors, consisting chiefly, of nitric, hydro-chloric, sulfuric and carbonic acids, substantially as and for the purpose set forth.

3. The improvement in the art of roasting ores and subliming minerals, and the recovery of the evolved vapors, which consists, in grinding the ores and minerals, and in mixing the same with nitrate of sodium or potassium; and in roasting and subliming the resultant mixture in a suitable furnace, and in injecting aqueous vapors into the same; and in bringing the vapors resultant from the said treatment, consisting chiefly, of sulfuric acid vapors, carbonic acid gas and metallic vapors, in contact with a combination of nitric acid, hydro-chloric acid and of a salt of the alkali metals, namely, chloride of sodium, to cause reactions with the production of chlorides and carbonates of the evolved metallic vapors and an auxiliary reaction with the production of a sulfate of the said salt of the said alkali metal, substantially as and for the purpose set forth.

4. The improvement in the art of the recovery of evolved vapors from the roasting, subliming and smelting of ores, minerals and compounds, which consists, in bringing the said vapors in contact with a combination of nitric acid, hydro-chloric acid, sulfuric acid, carbonic acid gas and of a suitable salt of an alkali metal, in the manner as specified, the said combination causing a reaction resulting in the production of chlorides and carbonates of the evolved metallic vapors, and an auxiliary reaction resulting in the production of a sulfate of the said salt of the alkali metals, substantially as and for the purpose set forth.

HEINRICH F. D. SCHWAHN.

Witnesses:
GUS. SCHWAHN,
HENRY STUBENRAUCH.